(No Model.)
G. KAFFENBERGER.
SCREENING MACHINE.
No. 276,596. Patented May 1, 1883.
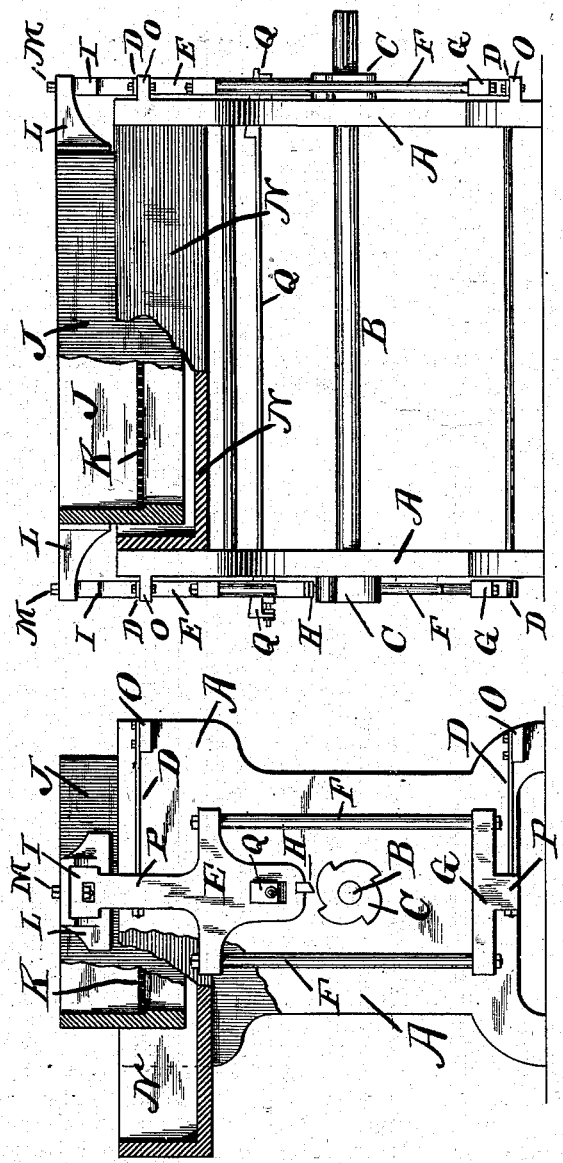
WITNESSES:
Gustav Kaffenberger INVENTOR
by James W. See.
ATTORNEY

UNITED STATES PATENT OFFICE.

GUSTAV KAFFENBERGER, OF HAMILTON, OHIO, ASSIGNOR TO THE BLACK & CLAWSON COMPANY, OF SAME PLACE.

SCREENING-MACHINE.

SPECIFICATION forming part of Letters Patent No. 276,596, dated May 1, 1883.

Application filed February 13, 1883. (No model.)

*To all whom it may concern:*

Be it known that I, GUSTAV KAFFENBERGER, of Hamilton, Butler county, Ohio, have invented certain new and useful Improvements in Screening-Machines, of which the following is a specification.

This invention pertains to machines in which a horizontally-disposed screen is agitated by suitable mechanism, whereby matter upon the screen is subjected to motion and to screening action.

The invention relates to method and means for vibrating the screen, and to the means for connecting the screen to its supports.

The nature of the invention will be understood from the description and accompanying drawings, in which—

Figure 1 is a side view, and Fig. 2 a front view, of a paper-pulp-screening machine embodying my improvements. I choose for illustration a paper-pulp-screening machine, because in such machines a wet process is involved, and my improvements are especially useful in connection with such process, as hereinafter specified.

In the drawings, A represents the main frame of the machine; B, a shaft journaled therein and adapted to be revolved by power; C, a pair of knocking-cams fixed on the shaft; D, flexible radius-bars attached at one end to the main frame; E F G, a pair of yoke-frames, one on each side of the machine, to which the free end of the radius-bars are attached; H, a strike-shoe fixed in each yoke-frame to receive the knock from the cams; I I, upward prolongations from the yoke-frames; J, a screen-box; K, the screen-plate; L L, arms secured to sides of screen-box and connecting with the prolongations of the yoke-frames by means of bolts M; N, a box below screen-box, supported by main frame, and which may be provided with suitable outlets; O, lugs on main frame to serve as attaching-pieces for the radius-bars D; P, the points of attachment of the vibrating ends of the radius-bars to the yoke-frames, and Q an adjusting device of common form to limit the fall of the vibrating parts as they descend.

The radius-bars secure to the screen a uniform vertical vibration over its entire surface. The bars D may be pivoted links, the pivots being located, of course, at O and P; but for slight vibrations the fixed flexible bars are preferable, as they suppress all joints liable to wear and become loose, and thus destroy the accuracy of the motion.

Screening-machines have been devised with a screen-box mounted on a stem carried in a vertical guide. This secures a truly vertical motion; but I object to a sliding motion and to close-fitting guides and stems when applied to machines designed for very delicate vibrations at high speed.

Machines with a stem fitting in a guide form no part of my invention, and I disclaim them, broadly.

Screening-machines have also been devised with a screen-box carried on the center of flexible bars fixed at both ends to the main frame. If one will imagine the upper bar, D, of my machine extended across to the left and attached to the frame in the same manner as they attach at O, and then a second bar, similar to the one just mentioned, arranged very close underneath the first one, a fair idea will be had of the structure of them. The two flexible bars arranged thus closely together form in fact one flexible support fixed at each end and carrying the screen-box at its center. The arrangement is of course duplicated on each side of the main frame, in that respect the same as my machine. The strike-shoe receives the cam knock far below the bar referred to, and as a consequence the side blow of the cam will give the screen-box a side motion or oscillation, the flexible bar yielding upward on one side of the screen-box attachment and downward on the other side. I consider that the structure is entirely inoperative for delicate work.

In my machine the bars D are at one side only of the yoke-frames, and they are so far apart as to form a parallelogram whose height is greater than its width. This structure prevents side action as the cam strikes. The location of the cam between the bars aids in this matter.

I disclaim as my invention all machines having flexible bars fixed at both ends to the main frame.

I claim as my invention—

1. In a screening-machine, the combination of a main frame, a cam-shaft or equivalent device adapted and arranged to impart vibratory motion, a horizontal screen, vertical pieces attached to the screen, and radius-bars with one end attached to the main frame and the other end attached to the vertical pieces, substantially as specified.

2. In a screening-machine, the combination of the main frame, a cam-shaft, a horizontal screen in a screen-box, a pair of yoke-frames attached to the screen-box and engaging the cam-shaft, and radius-bars with one end attached to the yoke-frames and the other end attached to the main frame, substantially as specified.

3. In a screening-machine, the combination of a main frame, a cam-shaft or equivalent device adapted and arranged to impart vibratory motion, a horizontal screen, and flexible radius-bars having rigid connections at their ends with the screen and main frame, substantially as specified.

4. In a screening-machine, the combination of the main frame, a cam-shaft, a horizontal screen in a screen-box, a pair of yoke-frames attached to the screen-box and engaging the cam-shaft, and flexible radius-bars having rigid connections at their ends with the yoke-frames and main frame, substantially as specified.

5. In a screening-machine, the combination of a main frame, a cam-shaft, yoke-frames attached to the main frame and engaging the cam-shaft, a screen in a screen-box, and engaging elements secured to the screen-box and separately joined to the yoke-frames, substantially as specified.

6. In a screening-machine, the combination of main frame A, cam-shaft B C, screen and box J K, radius-bars D, yoke-frames E F G, having upward prolongations P, arms L, and bolts M, substantially as specified.

7. In a screening-machine, the combination of a main frame, a horizontal screen, vertical pieces attached to the screen, radius-bars connecting the vertical pieces flexibly to the main frame, and a cam-shaft or equivalent device for imparting vibratory motion, arranged to act upon said vertical pieces at a point between the attached radius-bars, substantially as and for the purpose specified.

GUSTAV KAFFENBERGER.

Witnesses:
L. P. CLAWSON,
J. W. SEE.